(12) United States Patent
Tseng et al.

(10) Patent No.: US 12,306,523 B1
(45) Date of Patent: May 20, 2025

(54) DOUBLE-SIDED DISPLAY DEVICE

(71) Applicant: AUO Corporation, Hsinchu (TW)

(72) Inventors: Heng Yi Tseng, Hsinchu (TW); Kun-Cheng Tien, Hsinchu (TW); Chih-Kang Wu, Hsinchu (TW)

(73) Assignee: AUO Corporation, Hsinchu (TW)

( * ) Notice: Subject to any disclaimer, the term of this patent is extended or adjusted under 35 U.S.C. 154(b) by 0 days.

(21) Appl. No.: 18/393,500

(22) Filed: Dec. 21, 2023

(30) Foreign Application Priority Data

Nov. 2, 2023 (TW) ................. 112142288

(51) Int. Cl.
*G03B 21/60* (2014.01)
*G02B 27/01* (2006.01)

(52) U.S. Cl.
CPC ......... *G03B 21/60* (2013.01); *G02B 27/0101* (2013.01); *G02F 2201/44* (2013.01)

(58) Field of Classification Search
CPC .... H10K 59/50; H10K 59/128; G02F 1/1347; G02F 1/13471; G02F 2201/44
See application file for complete search history.

(56) References Cited

U.S. PATENT DOCUMENTS

| | | | |
|---|---|---|---|
| 10,578,942 | B2 | 3/2020 | Kashima |
| 10,703,276 | B2 | 7/2020 | Kanaguchi |
| 2016/0179452 | A1* | 6/2016 | Huang ............... G09G 3/36 345/3.1 |
| 2017/0261782 | A1* | 9/2017 | Lee ................ G02F 1/134309 |
| 2019/0077313 | A1* | 3/2019 | Kanaguchi ............ B60K 35/00 |
| 2023/0004032 | A1* | 1/2023 | Kuo .................. G02F 1/13725 |

FOREIGN PATENT DOCUMENTS

| | | |
|---|---|---|
| CN | 107065371 | 8/2017 |
| CN | 109507802 | 3/2019 |
| CN | 112644383 | 4/2021 |
| CN | 215932299 | 3/2022 |

OTHER PUBLICATIONS

Cheng-Chang Li et al., "Enhanced image quality of OLED transparent display by cholesteric liquid crystal back-panel", Optics Express, vol. 25, Issue 23, Nov. 2017, pp. 29199-29206.

* cited by examiner

*Primary Examiner* — Jessica M Merlin
(74) *Attorney, Agent, or Firm* — JCIPRNET (57) ABSTRACT

A double-sided display device includes a transparent self-luminous display panel, a switching panel and a projection device. The transparent self-luminous display panel has a light-emitting side and a backside opposite to the light-emitting side. The switching panel is disposed on the backside of the transparent self-luminous display panel. The switching panel includes a first electrode, a second electrode and a liquid crystal layer disposed between the first electrode and the second electrode. The first electrode and the second electrode are configured to control liquid crystal molecules in the liquid crystal layer so that the switching panel includes a scattering state and a transparent state. The projection device is configured to project toward the light-emitting side of the transparent self-luminous display panel.

9 Claims, 9 Drawing Sheets

DOUBLE-SIDED DISPLAY DEVICE

CROSS-REFERENCE TO RELATED APPLICATION

This application claims the priority benefits of Taiwan application no. 112142288, filed on Nov. 2, 2023. The entirety of each of the above-mentioned patent applications is hereby incorporated by reference herein and made a part of this specification.

BACKGROUND

Technical Field

The present disclosure relates to a double-sided display device.

Description of Related Art

Double-sided display device is an innovative screen technology with wide and diverse applications. For example, double-sided display devices have prominent applications in advertising. A double-sided display device may be used to fabricate billboards and signage, so that advertisement may be displayed in different directions, which increases the visibility and effectiveness of advertisement and attracts more attention. In shop window displays, retailers may trigger passers' interests through double-sided displays to present product information, promotions and brand information.

Moreover, double-sided display devices are normally used in exhibitions and museums. These devices may be used to display different exhibit information and historical background, so that visitors may get a more comprehensive understanding of the exhibits. The double-sided display devices provide interactivity and attraction, thereby enhancing people's engagement. In general, double-sided display devices play an important role in different fields. The double-sided display devices offer versatility to inform, attract attention and entertain. Therefore, many manufacturers are currently committed to developing double-sided display devices with high performance.

SUMMARY

The present disclosure provides a multifunctional double-sided display device that may operate in a variety of different modes to meet various requirements.

At least one embodiment of the present disclosure provides a double-sided display device, which includes a transparent self-luminous display panel, a switching panel and a projection device. The transparent self-luminous display panel has a light-emitting side and a backside opposite to the light-emitting side. The switching panel is disposed on the backside of the transparent self-luminous display panel. The switching panel includes a first electrode, a second electrode and a liquid crystal layer disposed between the first electrode and the second electrode. The first electrode and the second electrode are configured to control liquid crystal molecules in the liquid crystal layer so that the switching panel includes a scattering state and a transparent state. The projection device is configured to project toward the light-emitting side of the transparent self-luminous display panel. The double-sided display device includes the following usage modes: when the transparent self-luminous display panel and the projection device are turned off, and the switching panel is switched to the transparent state, the double-sided display device is in the transparent mode; when the transparent self-luminous display panel and the projection device are turned off, and the switching panel is switched to the scattering state, the double-sided display device is in the shielding mode, wherein the transmittance of the double-sided display device in the shielding mode is lower than the transmittance of the double-sided display device in the transparent mode; when the transparent self-luminous display panel is turned on, plus the projection device is turned off and the switching panel is switched to the transparent state, the double-sided display device is in the augmented reality (AR) mode; when the transparent self-luminous display panel is turned on, plus the projection device is turned off and the switching panel is switched to the scattering state, the double-sided display device is in the single-sided display mode; when the transparent self-luminous display panel and projection device are turned on, and the switching panel is switched to the scattering state, the double-sided display device is in the double-sided display mode.

At least one embodiment of the present disclosure provides a double-sided display device. The double-sided display device includes a transparent self-luminous display panel, a switching panel and a projection device. The transparent self-luminous display panel has a light-emitting side and a backside opposite to the light-emitting side. The switching panel is disposed on the back side of the transparent self-luminous display panel. The switching panel includes a first electrode, a second electrode, and a liquid crystal layer disposed between the first electrode and the second electrode. The first electrode and the second electrode are disposed to control liquid crystal molecules in the liquid crystal layer. The projection device is disposed to project toward the light-emitting side of the transparent self-luminous display panel. The light emitted by the projection device passes through the transmitting region of the transparent self-luminous display panel.

Based on the above, the double-sided display device includes a transparent self-luminous display panel, a switching panel and a projection device, and the projection device projects towards the light-emitting side of the transparent self-luminous display panel. Therefore, the double-sided display device may operate in a variety of different modes through various operations of the transparent self-luminous display panel, switching panel, and projection device, thereby meeting various requirements.

DESCRIPTION OF THE EMBODIMENTS

FIG. 1A to FIG. 1E are schematic cross-sectional views of various operation modes of a double-sided display device 1 according to an embodiment of the present disclosure. First, please refer to FIG. 1A. The double-sided display device 1 includes a transparent self-luminous display panel 100, a switching panel 200 and a projection device 300. In some embodiments, the double-sided display device 1 further includes an outer transparent cover 400 and a carrier plate 410.

Figure 1A:
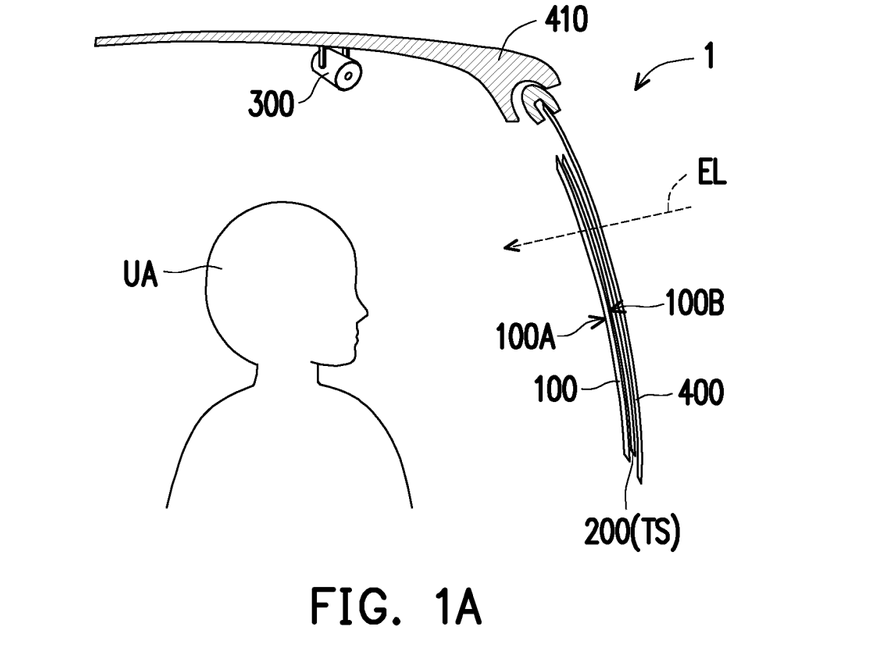
FIG. 1A is a schematic cross-sectional view of a double-sided display device in a transparent mode according to an embodiment of the present disclosure.

The transparent self-luminous display panel 100 has a light-emitting side 100A and a back side 100B opposite to the light-emitting side 100A. The light-emitting side 100A may emit light, while the backside 100B does not emit light. The transparent self-luminous display panel 100 may be flat or curved. The transparent self-luminous display panel 100 is, for example, a transparent organic light-emitting diode display panel, a transparent micro light-emitting diode display panel, or other types of transparent self-luminous display panels. The transparent self-luminous display panel 100 includes light-emitting elements (such as organic light-emitting diodes, micro light-emitting diodes, or other types of light-emitting elements), so that the transparent self-luminous display panel 100 may display images on the light-emitting side 100A when being turned on.

The switching panel 200 is disposed on the backside 100B of the transparent self-luminous display panel 100. The switching panel 200 may be flat or curved. The switching panel 200 includes a first electrode (please refer to FIG. 3 and FIG. 4), a second electrode (please refer to FIG. 3 and FIG. 4), and a liquid crystal layer (please refer to FIG. 3 and FIG. 4) disposed between the first electrode and the second electrode. The first electrode and the second electrode are disposed to control liquid crystal molecules in the liquid crystal layer so that the switching panel 200 includes a scattering state and a transparent state. Specifically, an electric field is generated by applying different voltages to the first electrode and the second electrode, and the liquid crystal molecules in the liquid crystal layer are controlled by the electric field, and the haze and transmittance of the switching panel 200 are changed. The switching panel 200 in the scattering state has high haze and low transmittance, while the switching panel 200 in the transparent state has low haze and high transmittance. In some embodiments, the haze of the switching panel 200 in the scattering state is greater than 80% (e.g., 85%, 90%, 95%, or 97%), and the transmittance is less than 50% (e.g., 40%, 30%, 20% or 10%). In some embodiments, the haze of the switching panel 200 in the transparent state is less than 15% (e.g., 10%, 5%, or 3%), and the transmittance is greater than 50% (e.g., 60%, 70%, 80%, or 90%). In some embodiments, the switching panel 200 in the scattering state may exhibit a white haze state or a black haze state.

The material of the outer transparent cover 400 includes, for example, glass, quartz, organic polymer or other applicable transparent materials. The outer transparent cover 400 may be flat or curved. In some embodiments, the switching panel 200 is disposed between the outer transparent cover 400 and the transparent self-luminous display panel 100. In this way, it is possible to reduce the negative impact of the switching panel 200 on the image displayed by the transparent self-luminous display panel 100 and prevent the transparent self-luminous display panel 100 from being blocked by the switching panel 200 and causing a decrease in image brightness.

The projection device 300 is disposed to project toward the light-emitting side 100A of the transparent self-luminous display panel 100. Specifically, the projection device 300 is separated from the light-emitting side 100A of the light-emitting display panel 100 and emits light toward the light-emitting side 100A of the transparent self-luminous display panel 100 when being turned on. The light emitted by the projection device 300 passes through the transmitting region of the transparent self-luminous display panel 100 and illuminates the switching panel 200. In some embodiments, the projection device 300 does not overlap the transparent self-luminous display panel 100 in a direction perpendicular to the light-emitting side 100A of the transparent self-luminous display panel 100, thereby preventing the projection device 300 from blocking the image emitted by the transparent self-luminous display panel 100.

In some embodiments, the projection device 300 is disposed on the carrier plate 410. When the double-sided display device 1 is a vehicle display panel, the carrier plate 410 is, for example, a vehicle roof. When the double-sided display device 1 is a smart window, the carrier plate 410 is, for example, a ceiling in a house. In some embodiments, the double-sided display device 1 is suitable for vehicle side windows, vehicle windshields, building windows, advertising boards, etc.

Please continue to refer to FIG. 1A. When the transparent self-luminous display panel 100 and the projection device 300 are turned off and the switching panel 200 is switched to the transparent state TS, the double-sided display device 1 is in the transparent mode. In the transparent mode, the ambient light EL outside the double-sided display device 1 may pass through the outer transparent cover 400, the switching panel 200 and the transmitting region of the transparent self-luminous display panel 100, so that the user UA located at the inner side of the double-sided display device 1 is able to see the view outside the double-sided display device 1.

Figure 1B:
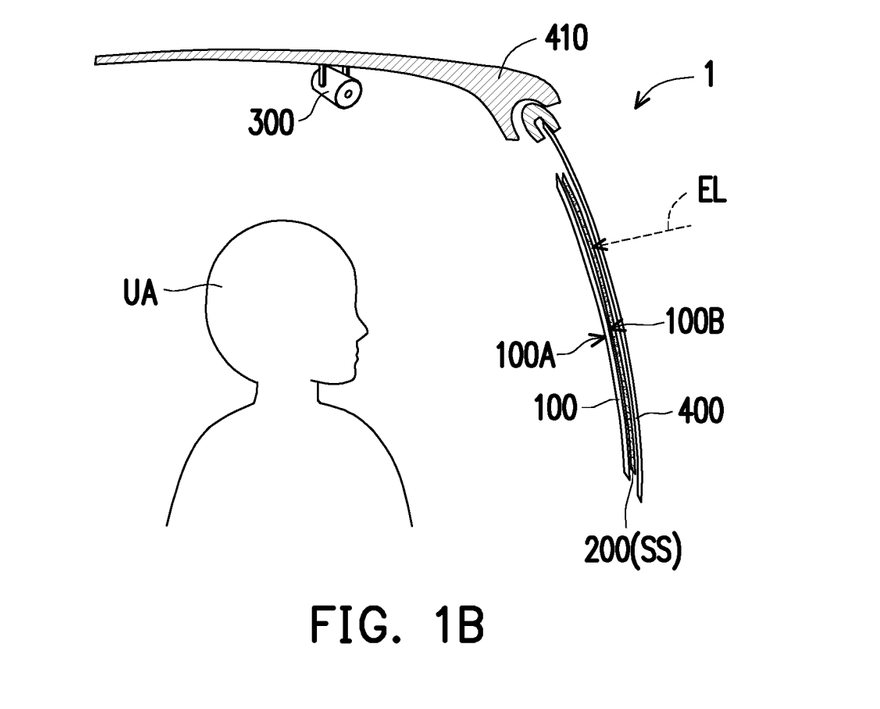
FIG. 1B is a schematic cross-sectional view of a double-sided display device in a shielding mode according to an embodiment of the present disclosure.

Please refer to FIG. 1B. When the transparent self-luminous display panel 100 and the projection device 300 are turned off, and the switching panel 200 is switched to the scattering state SS, the double-sided display device 1 is in the shielding mode. The transmittance of the double-sided display device 1 in the shielding mode is lower than the transmittance of the double-sided display device 1 in the transparent mode (as shown in FIG. 1A). In the shielding mode, the ambient light EL outside the double-sided display device 1 will be shielded by the switching panel 200 in the scattering state SS, making it difficult for the ambient light EL to pass through the double-sided display device 1, thereby achieving the sunshade effect.

Figure 1C:
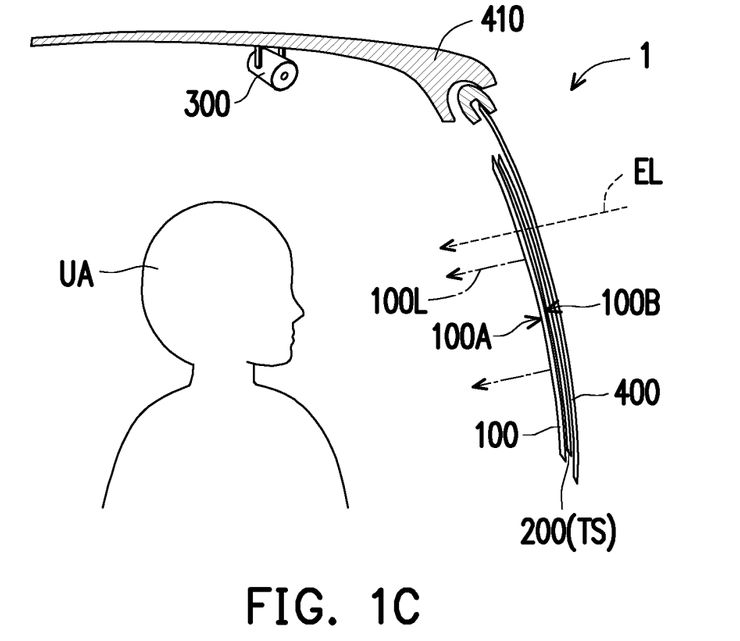
FIG. 1C is a schematic cross-sectional view of a double-sided display device in an augmented reality (AR) mode according to an embodiment of the present disclosure.

Please refer to FIG. 1C. When the transparent self-luminous display panel 100 is turned on, plus the projection device 300 is turned off and the switching panel 200 is switched to the transparent state TS, the double-sided display device 1 is in the augmented reality (AR) mode. In the AR mode, the ambient light EL outside the double-sided display device 1 may pass through the outer transparent cover 400, the switching panel 200 and the transmitting region of the transparent self-luminous display panel 100, so that the user UA located at the inner side of the double-sided display device 1 is able to see the view outside the double-sided display device 1. In the meantime, the light 100L emitted by the transparent self-luminous display panel 100 may also be seen by the user UA. In the AR mode, the image generated by the transparent self-luminous display panel 100 may be used in conjunction with the view on the outside. For example, when a vehicle passes an attraction, the transparent self-luminous display panel 100 may generate descriptions about the attraction, allowing the user UA to learn relevant knowledge about the attraction through the images displayed on the transparent self-luminous display panel 100 while the user UA pays a visit to the attraction.

Figure 1D:
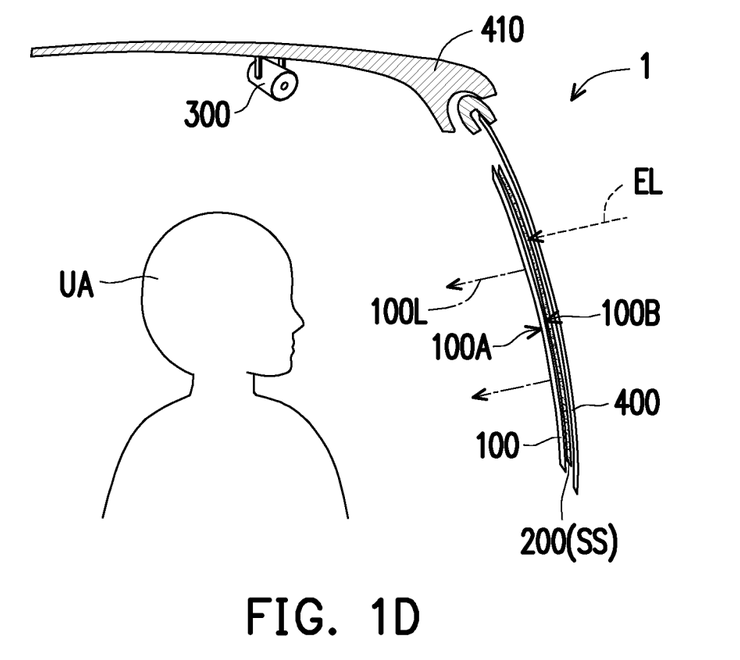
FIG. 1D is a schematic cross-sectional view of a double-sided display device in a single-sided display mode according to an embodiment of the present disclosure.

Referring to FIG. 1D, when the transparent self-luminous display panel 100 is turned on, plus the projection device 300 is turned off and the switching panel 200 is switched to the scattering state SS, the double-sided display device 1 is in the single-sided display mode. In the single-sided display mode, the ambient light EL outside the double-sided display device 1 will be blocked by the switching panel 200 in the scattering state SS, making it difficult for the ambient light EL to pass through the double-sided display device 1, thereby achieving the sunshade effect. In the meantime, it is possible to prevent the ambient light EL from affecting the light 100L emitted by the transparent self-luminous display panel 100. For example, the transparent self-luminous display panel 100 may be used in a vehicle to play movies, game screens, etc. to achieve the purpose of in-vehicle entertainment.

Figure 1E:
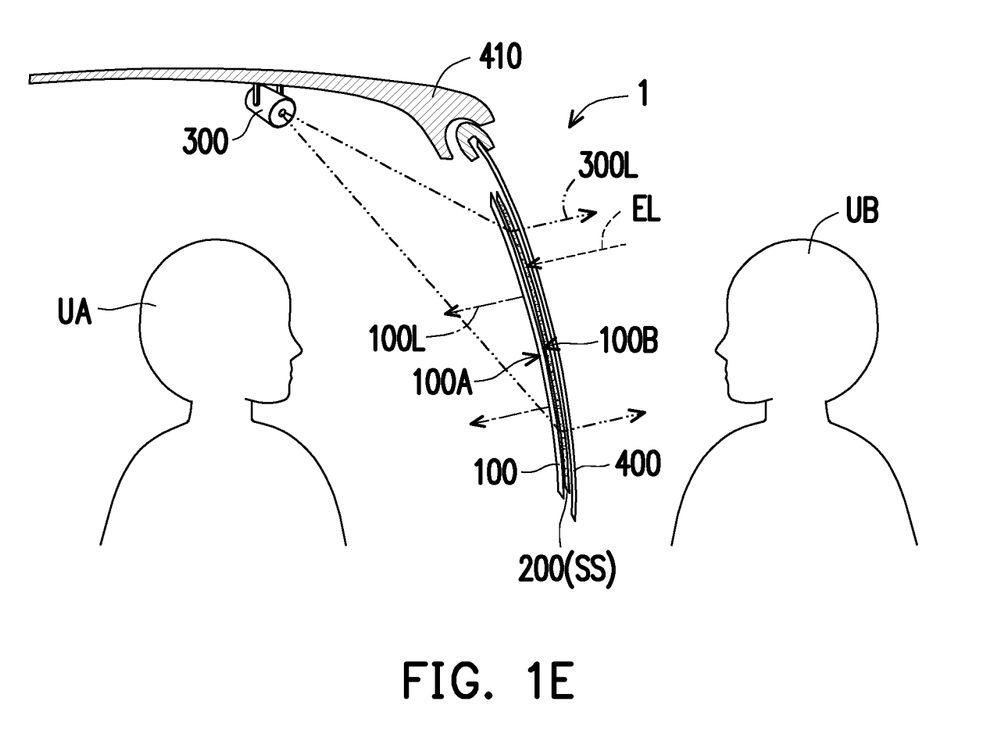
FIG. 1E is a schematic cross-sectional view of a double-sided display device in a double-sided display mode according to an embodiment of the present disclosure.

Referring to FIG. 1E, when the transparent self-luminous display panel 100 and the projection device 300 are turned on, and the switching panel 200 is switched to the scattering state SS, the double-sided display device 1 is in the double-sided display mode. In the double-sided display mode, the ambient light EL outside the double-sided display device 1 will be blocked by the switching panel 200 in the scattering state SS, making it difficult for the ambient light EL to pass through the double-sided display device 1, thereby achieving the sunshade effect. In the meantime, it is possible to prevent the ambient light EL from affecting the light 100L emitted by the transparent self-luminous display panel 100. In addition, the projection device 300 projects toward the light-emitting side 100A of the transparent self-luminous display panel 100, and the light 300L emitted by the projection device 300 passes through the transmitting region of the transparent self-luminous display panel 100 and forms an image on the switching panel 200 in the scattering state SS. In the double-sided display mode, the light 100L emitted by the transparent self-luminous display panel 100 may be seen by the user UA located at the inner side the double-sided display device 1, and the light 300L emitted by the projection device 300 may be seen by the user UB located outside the double-sided display device 1. For example, while the user UA uses the image generated by the transparent self-luminous display panel 100 for in-vehicle entertainment, the user UB may see the image generated by the projection device 300 (such as an advertising screen).

Based on the above, the double-sided display device 1 may be operated in a variety of different modes through various operations of the transparent self-luminous display panel 100, the switching panel 200 and the projection device 300, thereby satisfying various requirements.

Figure 2:
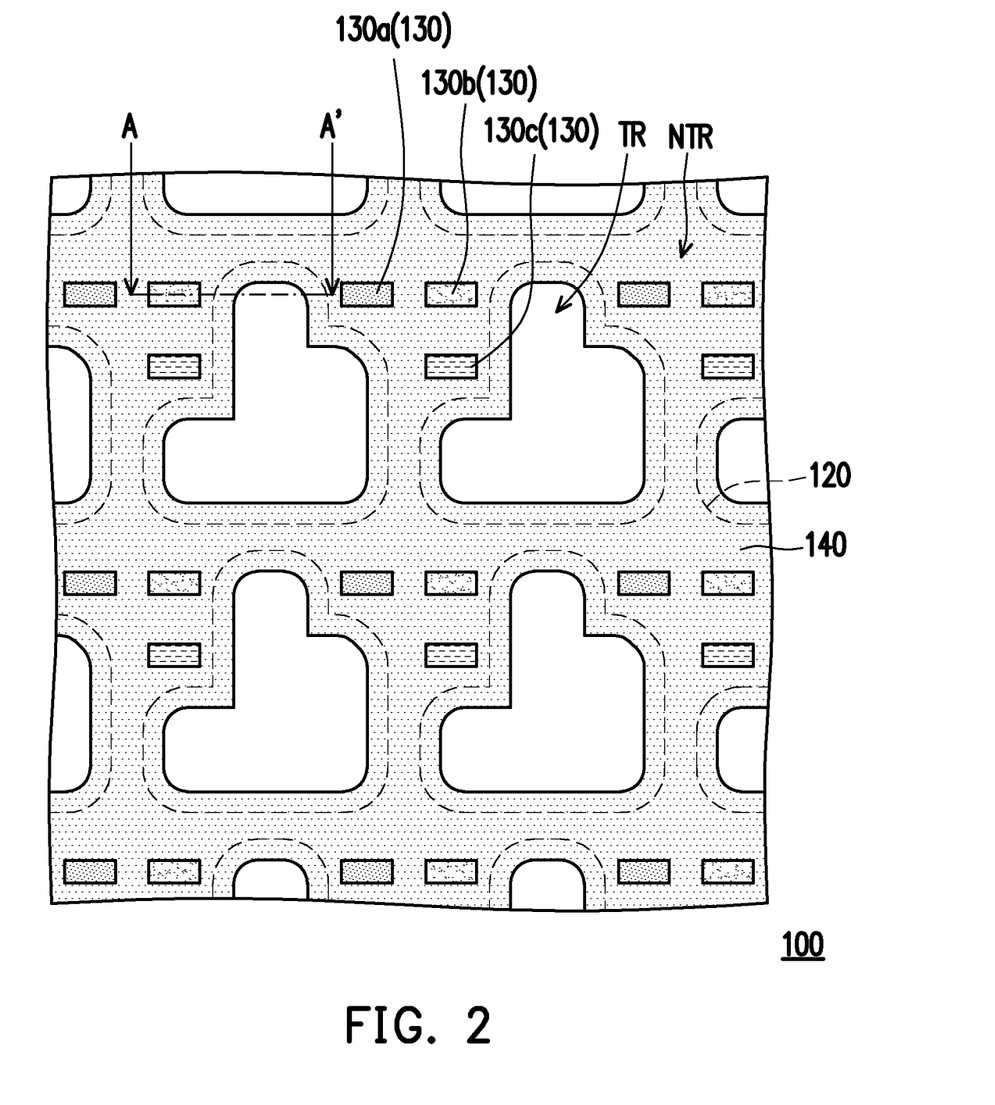
FIG. 2 is a schematic top view of a transparent self-luminous display panel according to an embodiment of the present disclosure.

FIG. 2 is a schematic top view of a transparent self-luminous display panel according to an embodiment of the present disclosure. For example, FIG. 2 is a schematic top view of the transparent self-luminous display panel 100 in the double-sided display device 1 of FIG. 1A to FIG. 1E. Referring to FIG. 2, the transparent self-luminous display panel 100 has a transmitting region TR and a non-transmitting region NTR. The circuit structure 120 and the plurality of light-emitting diodes 130 are located in the non-transmitting region NTR. In FIG. 2, the circuit structure 120 is illustrated with dashed lines, and the specific circuit layout of the circuit structure 120 is omitted. The circuit structure 120 includes, for example, metal wires, active components, passive components or other components. The light-emitting diode 130 is disposed on the circuit structure 120 and is electrically connected to the circuit structure 120. In this embodiment, the light-emitting diodes 130 are miniature light-emitting diodes and include a red light-emitting diode 130a, a green light-emitting diode 130b and a blue light-emitting diode 130c.

The light-absorbing layer 140 is located on the circuit structure 120, and defines a non-transmitting region NTR and a transmitting region TR. The light-absorbing layer 140 is, for example, black resin, black metal, or other suitable materials. The light-absorbing layer 140 has low reflectivity, thereby preventing the light emitted by the projection device from being reflected by the transparent self-luminous display panel 100. Moreover, the light-absorbing layer 140 has low transmittance, thereby preventing the circuit structure 120 from affecting the image displayed by the transparent self-luminous display panel 100.

Figure 3:
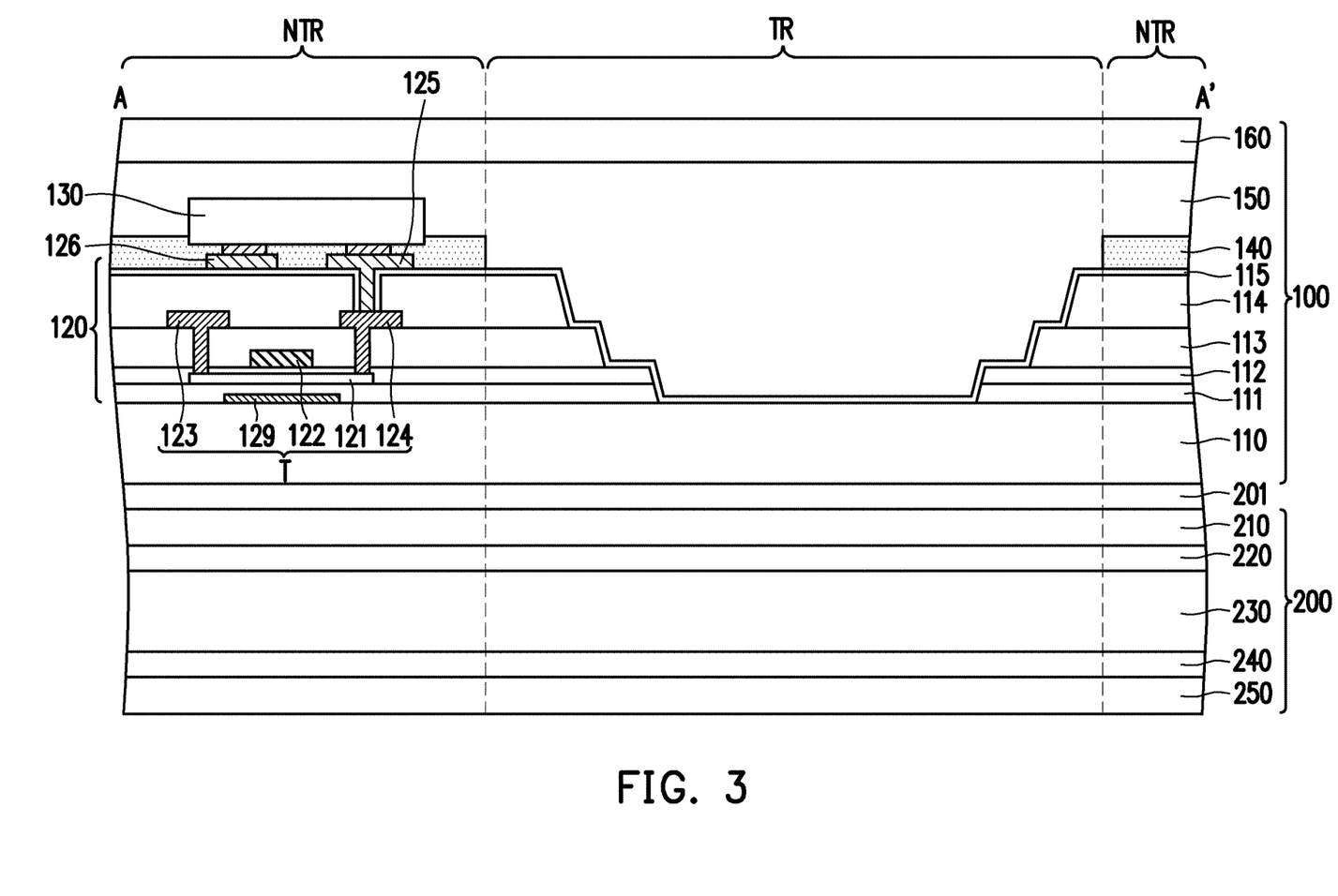
FIG. 3 is a schematic cross-sectional view of a transparent self-luminous display panel and a switching panel according to an embodiment of the present disclosure.

FIG. 3 is a schematic cross-sectional view of a transparent self-luminous display panel 100 and a switching panel 200 according to an embodiment of the present disclosure. For example, the transparent self-luminous display panel 100 of FIG. 3 corresponds to the position of line A-A' of FIG. 2. Please refer to FIG. 3. The transparent self-luminous display panel 100 includes a first transparent substrate 110, a first insulating layer 111, a second insulating layer 112, a third insulating layer 113, a fourth insulating layer 114, a fifth insulating layer 115, a circuit structure 120, a plurality of light-emitting diodes 130, a light-absorbing layer 140, an encapsulating layer 150, and a second transparent substrate 160.

The circuit structure 120 is located in the non-transmitting region NTR of the transparent self-luminous display panel 100. In this embodiment, the circuit structure 120 includes an active component T, a first pad 125 and a second pad 126. The active component T includes a semiconductor layer 121, a gate 122, a first source/drain 123, a second source/drain 124 and a light-shielding layer 129. The light-shielding layer 129 is located on the first transparent substrate 110 and in the non-transmitting region NTR. The first insulating layer 111 is located on the first transparent substrate 110 and the light-shielding layer 129 and covers the light-shielding layer 129. The semiconductor layer 121 is located on the first insulating layer 111 and overlaps the light-shielding layer 129. Through the arrangement of the light-shielding layer 129, the problem of current leakage caused by the active component T being irradiated by light may be solved. The second insulating layer 112 is located on the first insulating layer 111 and the semiconductor layer 121 and covers the semiconductor layer 121. The gate 122 is located on the second insulating layer 112, and the second insulating layer 112 separates the gate 122 from the semiconductor layer 121. The third insulating layer 113 is located on the second insulating layer 112 and the gate 122 and covers the gate 122. The first source/drain 123 and the second source/drain 124 are located on the third insulating layer 113 and are electrically connected to the semiconductor layer 121. In this embodiment, the second insulating layer 112 and the third insulating layer 113 have a plurality of through holes overlapping the semiconductor layer 121, and the first source/drain 123 and the second source/drain 124 are respectively filled with the through holes to be electrically connected to the semiconductor layer 121.

The fourth insulating layer 114 is located on the first source/drain 123 and the second source/drain 124. The fifth insulation layer 115 is located on the fourth insulation layer 114. The first pad 125 and the second pad 126 are located on the fifth insulating layer 115. In this embodiment, the fourth insulating layer 114 and the fifth insulating layer 115 have through holes overlapping the second source/drain 124, and the first pad 125 is filled in the through holes to be electrically connected to the second source/drain 124.

In some embodiments, the semiconductor layer 121 is a single-layer or multi-layer structure, which includes amorphous silicon, polycrystalline silicon, microcrystalline silicon, single crystal silicon, organic semiconductor materials, oxide semiconductor materials (for example: indium zinc oxide material, indium gallium zinc oxide or other suitable materials, or a combination of the above materials) or other suitable materials or a combination of the above materials.

In some embodiments, the gate 122, the first source/drain 123 and the second source/drain 124 are each a single-layer or multi-layer structure, and the materials of them include, for example, chromium, gold, silver, copper, tin, lead, hafnium, tungsten, molybdenum, neodymium, titanium, tantalum, aluminum, zinc, nickel and other metals, alloys of the above metals, stacks of the above metals or other conductive materials.

In some embodiments, the materials of the first insulating layer 111, the second insulating layer 112, the third insulating layer 113, the fourth insulating layer 114 and the fifth insulating layer 115 include, for example, silicon oxide, silicon nitride, silicon oxynitride, aluminum oxide organic insulating materials or other suitable insulating materials.

In this embodiment, the active component T is a top gate type thin film transistor as an example, but the disclosure is not limited thereto. In other embodiments, the active component T may also be a bottom gate type thin film transistor, a double gate type thin film transistor, or other types of thin film transistors.

In some embodiments, each of the first insulating layer 111, the second insulating layer 112, the third insulating layer 113 and the fourth insulating layer 114 has an opening located in the transmitting region TR. Through the design of the foregoing openings, it is possible to reduce the influence of the first insulating layer 111, the second insulating layer 112, the third insulating layer 113 and the fourth insulating layer 114 on the transmittance of the transmitting region TR.

In some embodiments, the circuit structure 120 may include more conductive layers and insulating layers. The present disclosure does not limit the specific circuit layout of the circuit structure 120.

The light-emitting diode 130 is disposed on the circuit structure 120 and is located in the non-transmitting region NTR of the transparent self-luminous display panel 100. The light emitting diode 130 is bonded to the first pad 125 and the second pad 126.

The light-absorbing layer 140 is located on the first transparent substrate 110, and defines a non-transmitting region NTR and a transmitting region TR. In this embodiment, the light-absorbing layer 140 is formed on the fifth insulating layer 115, but the disclosure is not limited thereto. In other embodiments, any one of the first insulating layer 111, the second insulating layer 112, the third insulating layer 113 and the fourth insulating layer 114 may include a light-absorbing material and be used as a light-absorbing layer.

The encapsulating layer 150 covers the light-emitting diode 130. The second transparent substrate 160 is disposed on the encapsulating layer 150.

The switching panel 200 is disposed on the backside of the transparent self-luminous display panel 100. The switching panel 200 includes a first electrode 220, a second electrode 240, and a liquid crystal layer 230 disposed between the first electrode 220 and the second electrode 240. In this embodiment, the switching panel 200 optionally includes a first substrate 210 and a second substrate 250. The first electrode 220, the second electrode 240 and the liquid crystal layer 230 are located between the first substrate 210 and the second substrate 250.

In this embodiment, the switching panel 200 is bonded to the backside of the transparent self-luminous display panel 100 through the adhesive layer 201. The light-emitting diode 130 is further away from the switching panel 200 than the first transparent substrate 110. The first electrode 220, the liquid crystal layer 230 and the second electrode 240 of the switching panel 200 overlap with the non-transmitting region NTR and the transmitting region TR of the transparent self-luminous display panel 100.

Figure 4:
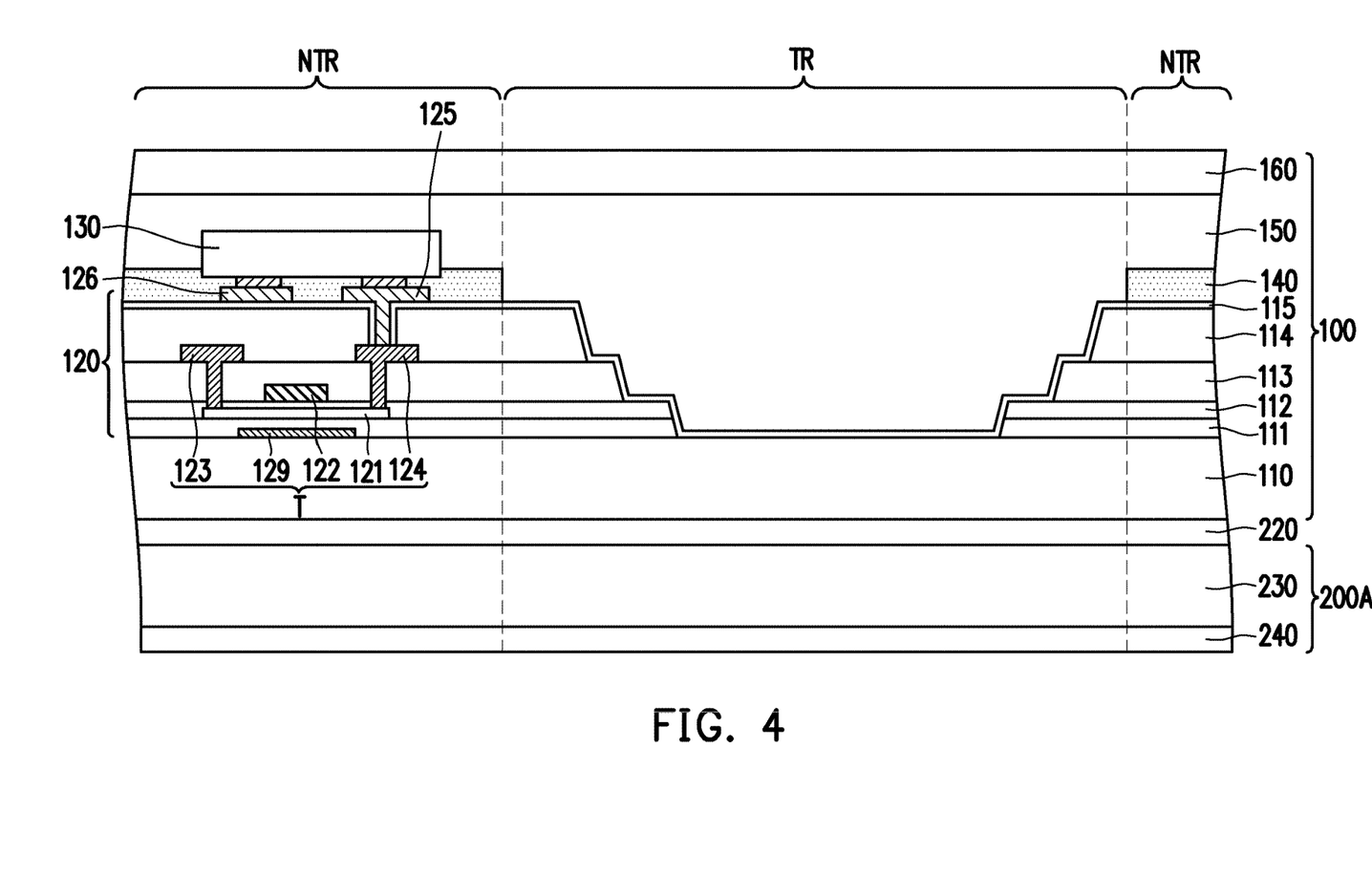
FIG. 4 is a schematic cross-sectional view of a transparent self-luminous display panel and a switching panel according to another embodiment of the present disclosure.

FIG. 4 is a schematic cross-sectional view of a transparent self-luminous display panel 100 and a switching panel 200A according to another embodiment of the present disclosure. It must be noted here that the embodiment of FIG. 4 adopts the reference numbers and part of the content of the embodiment of FIG. 3, where the same or similar numbers are used to represent the same or similar elements, and descriptions of the same technical content are omitted. For descriptions of omitted parts, reference may be made to the foregoing embodiments and will not be described again here.

Please refer to FIG. 4. In this embodiment, the switching panel 200A is directly formed on the backside of the first transparent substrate 110. In this embodiment, the first electrode 220 of the switching panel 200A is directly formed on the backside of the first transparent substrate 110 and contacts the backside of the first transparent substrate 110.

Figure 5A:
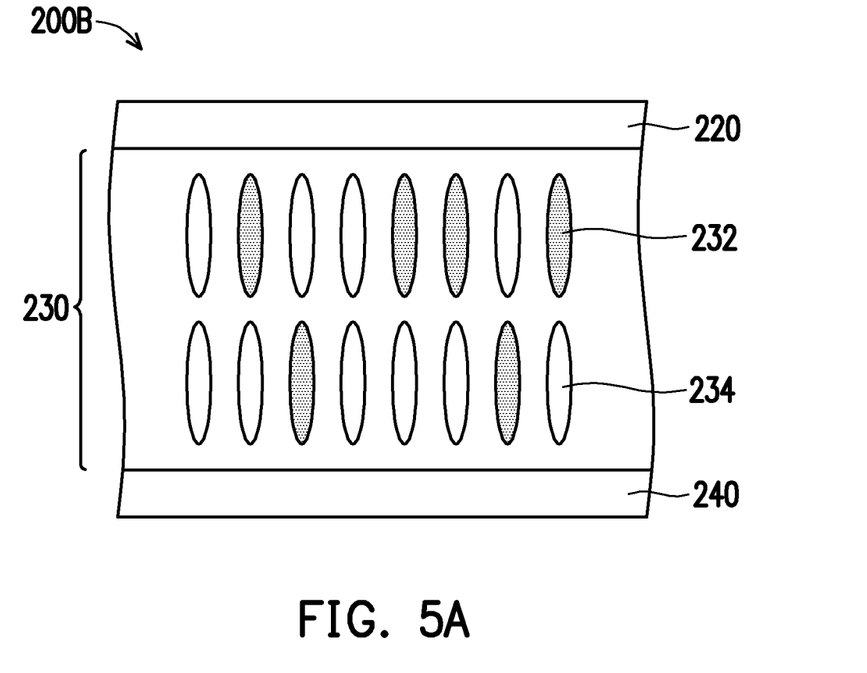
FIG. 5A and FIG. 5B are schematic cross-sectional views of a switching panel in different states according to an embodiment of the present disclosure.
Figure 5B:
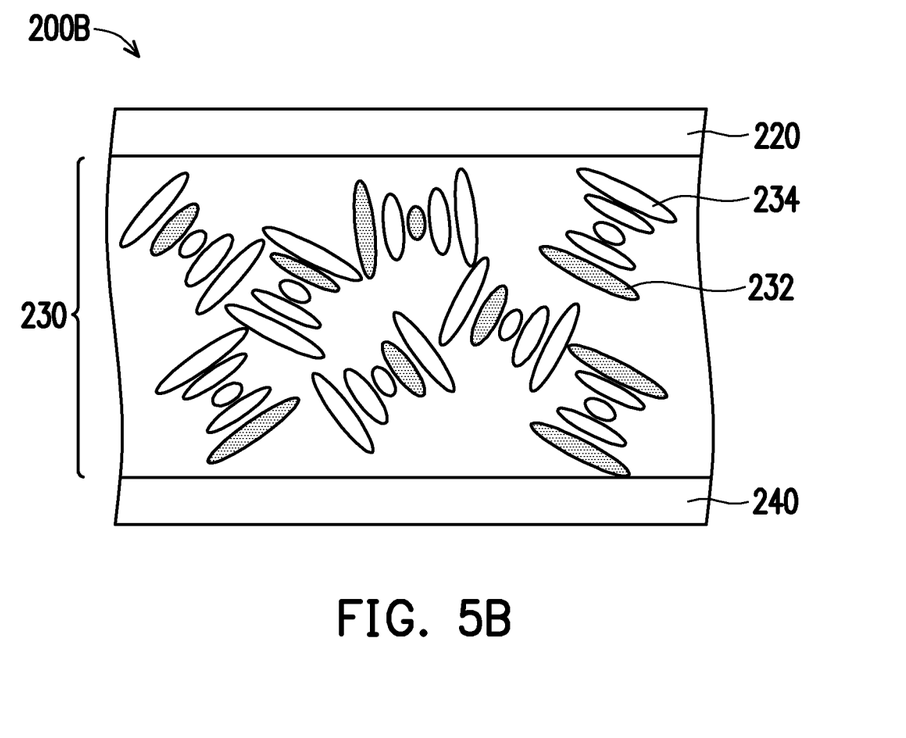

FIG. 5A and FIG. 5B are schematic cross-sectional views of a switching panel 200B in different states according to an embodiment of the present disclosure. Referring to FIG. 5A and FIG. 5B, the switching panel 200B includes a first electrode 220, a second electrode 240, and a liquid crystal layer 230 disposed between the first electrode 220 and the second electrode 240.

In this embodiment, the liquid crystal layer 230 includes liquid crystal molecules 234 and a dichroic dye 232, wherein the dichroic dye 232 and the liquid crystal molecules 234 are mixed together. The liquid crystal molecules 234 are, for example, cholesteric liquid crystals. In other words, the liquid crystal layer 230 includes, for example, dye-doped cholesteric liquid crystal.

When the driving voltage exceeds the saturation voltage (VH), the dye-doped cholesteric liquid crystal will switch to a vertical mode (as shown in FIG. 5A). In this state, the optical axis of the liquid crystal molecules is neatly parallel to the electric field between the first electrode 220 and the second electrode 240. Therefore, only a small amount of incident light will be absorbed by the liquid crystal layer 230, resulting in the switching panel 200B having high transparency and low haze.

If the driving voltage is released through a step voltage (VFC), the elastic restoring force of the liquid crystal molecules will be suppressed. Under the circumstances, the dye-doped cholesteric liquid crystal will switch to the focal-conic (FC) state, as shown in FIG. 5B. In this state, the incident light is absorbed and scattered simultaneously, causing the switching panel 200B to have low transparency and high haze.

The switching panel 200B of this embodiment may be applied to the double-sided display device of any of the aforementioned embodiments.

Figure 6A:
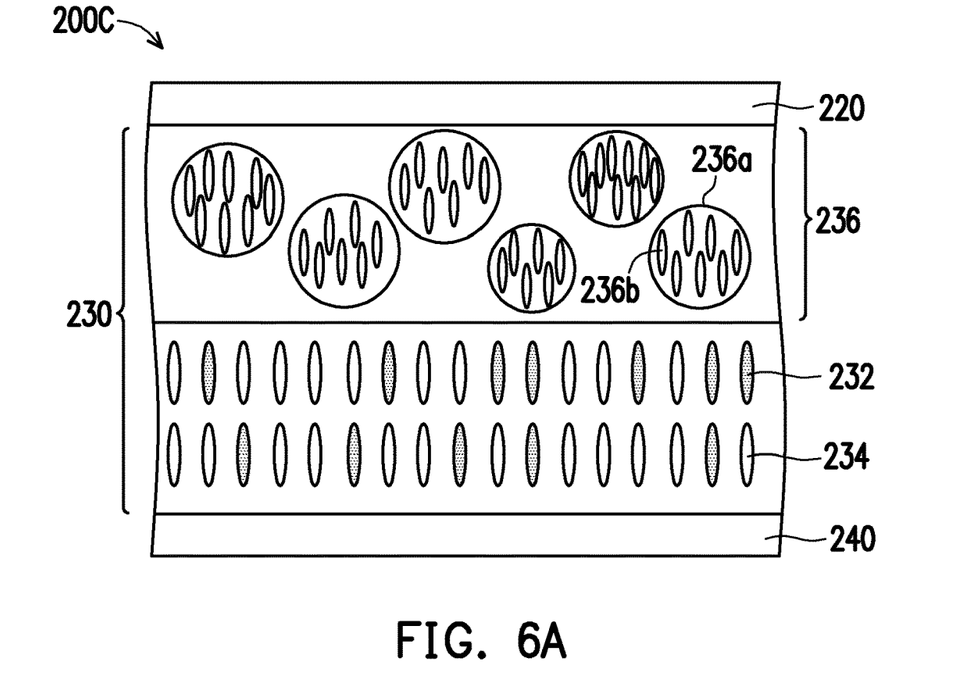
FIG. 6A and FIG. 6B are schematic cross-sectional views of a switching panel in different states according to yet another embodiment of the present disclosure.
Figure 6B:
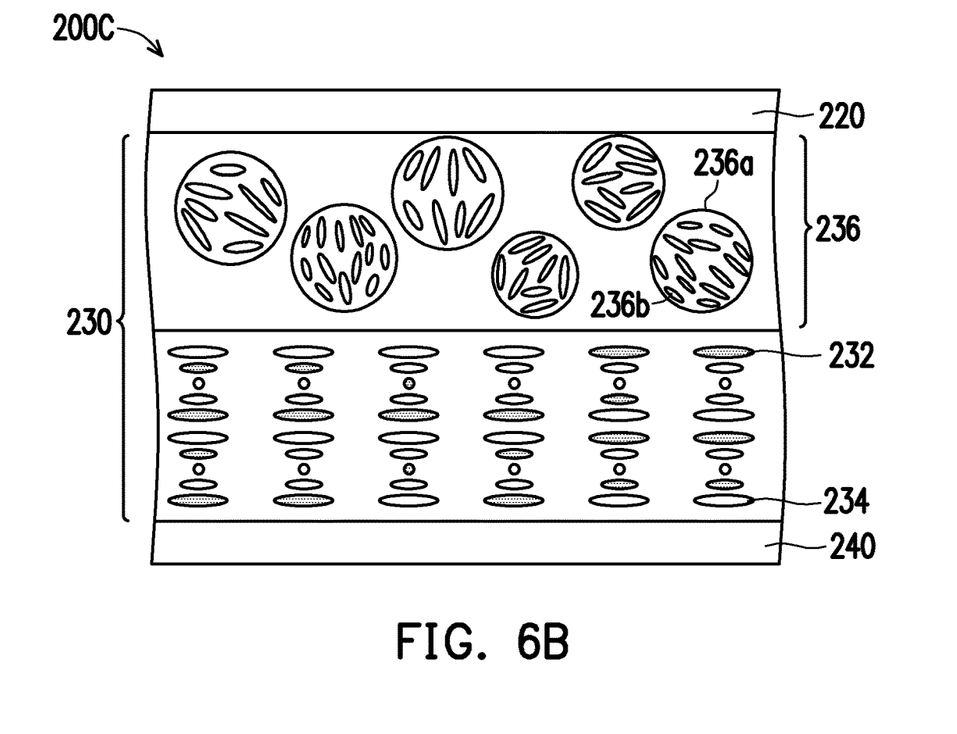

FIG. 6A and FIG. 6B are schematic cross-sectional views of a switching panel 200C in different states according to another embodiment of the present disclosure. Referring to FIG. 6A and FIG. 6B, the switching panel 200C includes a first electrode 220, a second electrode 240, and a liquid crystal layer 230 disposed between the first electrode 220 and the second electrode 240.

In this embodiment, the liquid crystal layer 230 includes liquid crystal molecules 234, a dichroic dye 232, and a polymer dispersed liquid crystal film (PDLC film) 236. The dichroic dye 232 is mixed with the liquid crystal molecules 234. The liquid crystal molecules 234 are, for example, cholesteric liquid crystals. In other words, the liquid crystal molecules 234 and the dichroic dye 232 in the liquid crystal layer 230 may also be collectively referred to as dye-doped cholesteric liquid crystal. The PDLC film 236 includes a capsule 236a. Each capsule 236a contains a plurality of liquid crystal molecules 236b. The capsule 236a includes, for example, a polymer. In some embodiments, the capsule 236a is, for example, a nano capsule, and the size thereof is between 100 nanometers and 200 nanometers. The liquid crystal molecules 234 and the liquid crystal molecules 236b are, for example, the same type or different types of liquid crystal molecules.

In this embodiment, in addition to using the electric field between the first electrode 220 and the second electrode 240 to control the dye-doped cholesteric liquid crystal, the liquid crystal molecules 236b in the capsule 236a may also be controlled, thereby allowing the switching panel 200C to be switched between a transparent state (shown in FIG. 6A) and a scattering state (shown in FIG. 6B).

The switching panel 200C of this embodiment may be applied to the double-sided display device of any of the aforementioned embodiments.

Figure 7A:
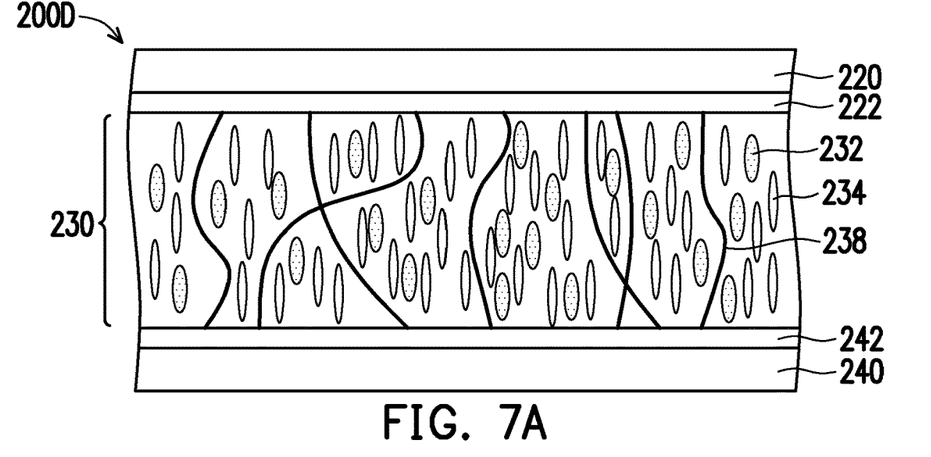
FIG. 7A to FIG. 7C are schematic cross-sectional views of a switching panel in different states according to still another embodiment of the present disclosure.
Figure 7B:
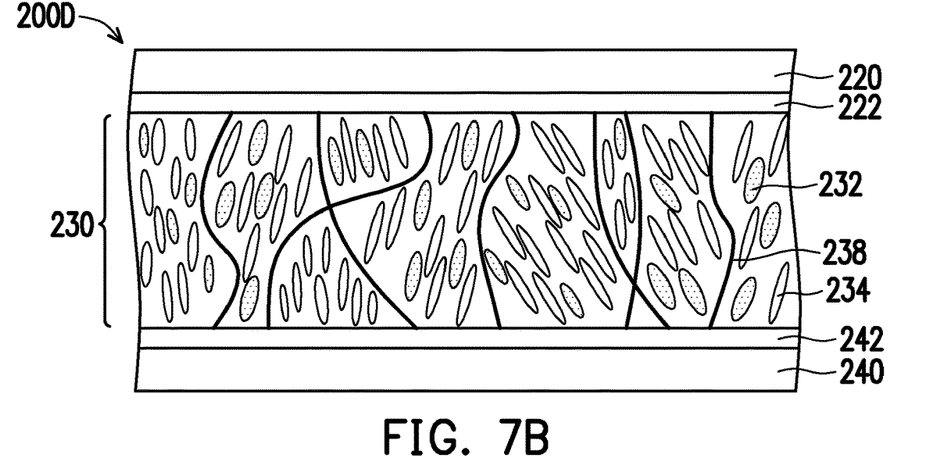
Figure 7C:
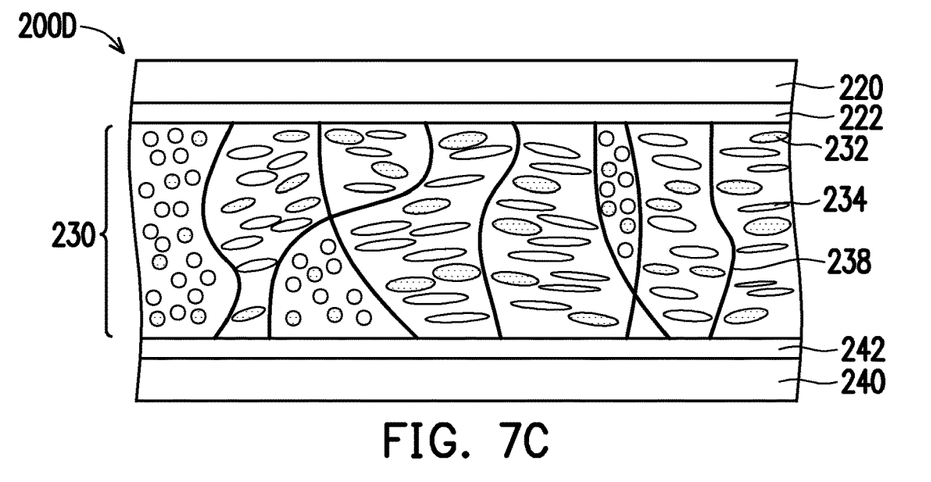

FIG. 7A to FIG. 7C are schematic cross-sectional views of a switching panel 200D in different states according to another embodiment of the present disclosure. Referring to FIG. 7A to FIG. 7C, the switching panel 200D includes a first electrode 220, a second electrode 240, and a liquid crystal layer 230 disposed between the first electrode 220 and the second electrode 240. In this embodiment, the switching panel 200D further includes a first alignment layer 222 disposed between the first electrode 220 and the liquid crystal layer 230 and a second alignment layer 242 disposed between the second electrode 240 and the liquid crystal layer 230.

In this embodiment, the liquid crystal layer 230 includes liquid crystal molecules 234, a dichroic dye 232 and a polymer network 238. The dichroic dye 232 is mixed with the liquid crystal molecules 234. The liquid crystal layer 230 in this embodiment is a polymer network liquid crystal (PNLC) layer.

In this embodiment, the electric field between the first electrode 220 and the second electrode 240 may be used to control the liquid crystal molecules 234 and the dichroic dye 232, thereby enabling the switching panel 200D to be switched between the transparent state (as shown in FIG. 7A) and the scattering state (shown in FIG. 7C). For example, when the voltage difference between the first electrode 220 and the second electrode 240 is 0, the switching panel 200D is in a transparent state, as shown in FIG. 7A. When the voltage difference between the first electrode 220 and the second electrode 240 is greater than the threshold voltage (Vth), the liquid crystal molecules 234 and the dichroic dye 232 begin to tilt under the influence of the electric field, as shown in FIG. 7B. When the voltage difference between the first electrode 220 and the second electrode 240 is significantly greater than the threshold voltage, the liquid crystal molecules 234 and the dichroic dye 232 are affected by the electric field and lie horizontally, as shown in FIG. 7C.

The switching panel 200D of this embodiment may be applied to the double-sided display device of any of the aforementioned embodiments.

In summary, the double-sided display device of the present disclosure includes a transparent self-luminous display panel, a switching panel and a projection device. Through various operations of the transparent self-luminous display panel, switching panel and projection equipment, the double-sided display device includes a transparent mode, a shielding mode, an AR mode, a single-sided display mode and a double-sided display mode, thereby satisfying various requirements.

What is claimed is:
1. A double-sided display device, comprising:
a transparent self-luminous display panel having a light-emitting side and a backside opposite to the light-emitting side;
a switching panel disposed on the backside of the transparent self-luminous display panel, wherein the switching panel comprises:
a first electrode;
a second electrode; and
a liquid crystal layer disposed between the first electrode and the second electrode, wherein the first electrode and the second electrode are disposed to control liquid crystal molecules in the liquid crystal layer so that the switching panel comprises a scattering state and a transparent state; and
a projection device disposed to project toward the light-emitting side of the transparent self-luminous display panel; wherein
the double-sided display device is configured to operate in a transparent mode, a shielding mode, an augmented reality mode, a single-sided display mode or a double-sided display mode;
in the transparent mode, the transparent self-luminous display panel and the projection device are turned off, and the switching panel is switched to the transparent state;
in the shielding mode, the transparent self-luminous display panel and the projection device are turned off, and the switching panel is switched to the scattering state, wherein a transmittance of the double-sided display device in the shielding mode is lower than a transmittance of the double-sided display device in the transparent mode;

in the augmented reality mode, the transparent self-luminous display panel is turned on, the projection device is turned off and the switching panel is switched to the transparent state;

in a single-sided display mode, the transparent self-luminous display panel is turned on, the projection device is turned off and the switching panel is switched to the scattering state; and in a double-sided display mode, the transparent self-luminous display panel and the projection device are turned on, and the switching panel is switched to the scattering state;

wherein the transparent self-luminous display panel comprises a transparent substrate, and the first electrode directly disposed on the backside of the transparent substrate.

2. The double-sided display device of claim 1, wherein a haze of the switching panel in the scattering state is greater than 80%, and a haze of the switching panel in the transparent state is less than 15%.

3. The double-sided display device of claim 1, wherein a transmittance of the switching panel in the transparent state is greater than 50%, and a transmittance of the switching panel in the scattering state is less than 50%.

4. The double-sided display device of claim 1, wherein in the double-sided display mode, the projection device projects toward the light-emitting side of the transparent self-luminous display panel, wherein a light emitted by the projection device passes through a transmitting region of the transparent self-luminous display panel, and forms an image on the switching panel in the scattering state.

5. The double-sided display device of claim 1, further comprising:

an outer transparent cover, wherein the switching panel is disposed between the outer transparent cover and the transparent self-luminous display panel.

6. The double-sided display device of claim 1, wherein the liquid crystal molecules of the liquid crystal layer comprise cholesteric liquid crystal, and the liquid crystal layer further comprises a dichroic dye.

7. The double-sided display device of claim 1, wherein the liquid crystal layer comprises a dichroic dye mixed with the liquid crystal molecules, and the liquid crystal layer further comprises a polymer dispersed liquid crystal film (PDLC film).

8. The double-sided display device of claim 1, wherein the transparent self-luminous display panel comprises:

a light-absorbing layer located on the transparent substrate and defines a non-transmitting region and a transmitting region, wherein the first electrode, the liquid crystal layer and the second electrode of the switching panel overlap the non-transmitting region and the transmitting region;

a circuit structure located in the non-transmitting region of the transparent self-luminous display panel; and a plurality of light-emitting diodes disposed on the circuit structure and located in the non-transmitting region of the transparent self-luminous display panel, wherein the plurality of light-emitting diodes are further away from the switching panel than the transparent substrate.

9. The double-sided display device of claim 8, wherein the first electrode directly contacts the backside of the transparent substrate.

* * * * *